US010283005B2

(12) United States Patent
Liu (10) Patent No.: US 10,283,005 B2
(45) Date of Patent: May 7, 2019

(54) IMAGE DISPLAY METHOD AND APPARATUS

(71) Applicant: Huawei Device Co., Ltd., Dongguan (CN)

(72) Inventor: Chen Liu, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 29 days.

(21) Appl. No.: 15/031,696

(22) PCT Filed: Oct. 24, 2013

(86) PCT No.: PCT/CN2013/085893
§ 371 (c)(1),
(2) Date: Apr. 22, 2016

(87) PCT Pub. No.: WO2015/058388
PCT Pub. Date: Apr. 30, 2015

(65) Prior Publication Data
US 2016/0267801 A1 Sep. 15, 2016

(51) Int. Cl.
*G09B 5/06* (2006.01)
*H04N 21/40* (2011.01)
(Continued)

(52) U.S. Cl.
CPC ......... *G09B 5/065* (2013.01); *G09B 19/0015* (2013.01); *G09B 19/0038* (2013.01);
(Continued)

(58) Field of Classification Search
USPC ....... 348/564, 563, 581, 510, 706, 719, 725, 348/747, 207.1, 207.99, 208.3, 211.9,
(Continued)

(56) References Cited

U.S. PATENT DOCUMENTS 8,023,726 B2 * 9/2011 Sundaresan ........ G06K 9/00342
345/604
8,107,721 B2 * 1/2012 Beardsley ................. G06T 7/13
382/100

(Continued)

FOREIGN PATENT DOCUMENTS

CN 101610715 A 12/2009
CN 101960840 A 1/2011
(Continued)

*Primary Examiner* — Brian P Yenke
(74) *Attorney, Agent, or Firm* — Leydig, Voit & Mayer, Ltd.

(57) ABSTRACT

Embodiments of the present invention disclose an image display method and apparatus, and relates to the field of Internet communications. The method includes: acquiring a source image and a user image corresponding to the source image, where the user image is a movement image generated after a user imitates the source image; processing the source image and the user image; and sending the processed source image and user image to a terminal, so that the terminal simultaneously displays the source image and the user image. In embodiments of the present invention, a terminal simultaneously presents a source image and a user image to a user, so that the user can visually compare a difference between the user image and the source image, which is convenient for the user to imitate the source image and accelerates a learning speed of the user.

10 Claims, 6 Drawing Sheets

(51) Int. Cl.
  *G09B 19/00* (2006.01)
  *H04N 21/478* (2011.01)
  *H04N 21/81* (2011.01)
(52) U.S. Cl.
  CPC .......... *H04N 21/40* (2013.01); *H04N 21/478* (2013.01); *H04N 21/8173* (2013.01)
(58) Field of Classification Search
  USPC .......... 348/211.3, 49, 50, 73, 140, 142, 143, 348/174; 382/155, 181, 232, 248; 715/238, 246, 273, 788; 463/31
  See application file for complete search history.

(56) References Cited

U.S. PATENT DOCUMENTS

| | | | | |
|---|---|---|---|---|
| 8,363,056 B2* | 1/2013 | Kojima | G09B 7/00 | 345/473 |
| 8,488,888 B2* | 7/2013 | Balan | G06F 3/011 | 348/77 |
| 8,696,450 B2* | 4/2014 | Rose | G09B 19/0038 | 463/30 |
| 8,724,906 B2* | 5/2014 | Shotton | G06K 9/00214 | 382/209 |
| 8,842,974 B2* | 9/2014 | Kitazato | G11B 27/034 | 386/219 |
| 8,892,219 B2* | 11/2014 | Pryor | B60K 35/00 | 382/107 |
| 8,953,909 B2* | 2/2015 | Guckenberger | G06T 11/00 | 382/305 |
| 8,989,521 B1* | 3/2015 | Ho | G06K 9/00711 | 348/61 |
| 8,994,826 B2* | 3/2015 | Bentley | G01S 19/19 | 348/139 |
| 9,011,293 B2* | 4/2015 | Shavit | A63B 71/0622 | 482/8 |
| 9,039,527 B2* | 5/2015 | Bentley | A63F 13/573 | 463/31 |
| 9,350,951 B1* | 5/2016 | Rowe | H04N 5/2621 | |
| 9,684,941 B2* | 6/2017 | Filler | G06T 1/0064 | |
| 2002/0064764 A1* | 5/2002 | Fishman | A63B 24/0003 | 434/252 |
| 2002/0114615 A1* | 8/2002 | Tojo | H04N 5/9205 | 386/248 |
| 2004/0209698 A1* | 10/2004 | Ueda | A63B 24/0003 | 473/150 |
| 2005/0141860 A1* | 6/2005 | Yoshida | G11B 27/031 | 386/232 |
| 2005/0272517 A1* | 12/2005 | Funk | A63B 15/00 | 473/222 |
| 2006/0094523 A1* | 5/2006 | Hall | A63B 69/3623 | 473/266 |
| 2006/0247070 A1* | 11/2006 | Funk | A63B 24/0003 | 473/222 |
| 2007/0285499 A1* | 12/2007 | Choi | H04N 7/148 | 348/14.02 |
| 2008/0143734 A1* | 6/2008 | Ishii | H04N 5/44513 | 345/581 |
| 2009/0042661 A1* | 2/2009 | Cheng | A63B 24/0003 | 473/266 |
| 2009/0204890 A1* | 8/2009 | Matsutani | H04N 1/0035 | 715/246 |
| 2009/0260426 A1* | 10/2009 | Lieberman | A61B 5/1036 | 73/65.01 |
| 2009/0298649 A1* | 12/2009 | Dyer | A63B 22/001 | 482/4 |
| 2009/0298650 A1* | 12/2009 | Kutliroff | A63B 71/0622 | 482/8 |
| 2009/0327890 A1* | 12/2009 | Mertz | G06T 7/0012 | 715/716 |
| 2010/0022351 A1* | 1/2010 | Lanfermann | A61B 5/1114 | 482/1 |
| 2010/0210359 A1* | 8/2010 | Krzeslo | A63F 13/10 | 463/31 |
| 2011/0013017 A1* | 1/2011 | Lee | H04N 5/232 | 348/143 |
| 2011/0018976 A1* | 1/2011 | Park | H04N 13/0018 | 348/51 |
| 2011/0044602 A1 | 2/2011 | Lim et al. | | |
| 2011/0098109 A1* | 4/2011 | Leake | A63F 13/428 | 463/30 |
| 2011/0195779 A1* | 8/2011 | Lau | A63F 13/60 | 463/31 |
| 2011/0267344 A1* | 11/2011 | Germann | G06K 9/00201 | 345/420 |
| 2011/0275045 A1* | 11/2011 | Bhupathi | G09B 19/003 | 434/247 |
| 2012/0090005 A1* | 4/2012 | Marlow | G06Q 30/0241 | 725/42 |
| 2012/0143358 A1* | 6/2012 | Adams | G06F 3/011 | 700/92 |
| 2012/0183939 A1* | 7/2012 | Aragones | A63B 24/0006 | 434/247 |
| 2012/0206577 A1* | 8/2012 | Guckenberger | G06T 11/00 | 348/47 |
| 2012/0309520 A1* | 12/2012 | Evertt | G06T 19/20 | 463/31 |
| 2013/0061259 A1* | 3/2013 | Raman | H04H 60/32 | 725/14 |
| 2013/0072353 A1* | 3/2013 | Alessandri | A63B 21/062 | 482/8 |
| 2013/0089843 A1 | 4/2013 | Hutchison | | |
| 2013/0089845 A1* | 4/2013 | Hutchison | G09B 19/003 | 434/257 |
| 2013/0131836 A1* | 5/2013 | Katz | G06F 3/017 | 700/12 |
| 2013/0171601 A1 | 7/2013 | Yuasa et al. | | |
| 2013/0177891 A1* | 7/2013 | Hammerschmidt | G09B 5/06 | 434/309 |
| 2013/0190658 A1* | 7/2013 | Flaction | A61B 5/1038 | 600/595 |
| 2013/0198766 A1 | 8/2013 | Yoon et al. | | |
| 2013/0222583 A1* | 8/2013 | Earnshaw | H04N 21/47202 | 348/143 |
| 2013/0230211 A1* | 9/2013 | Tanabiki | G06K 9/00342 | 382/103 |
| 2013/0271458 A1* | 10/2013 | Andriluka | G06K 9/00342 | 345/420 |
| 2013/0325887 A1* | 12/2013 | Takaoka | G06F 17/30283 | 707/758 |
| 2014/0135960 A1* | 5/2014 | Choi | A61B 5/0205 | 700/91 |
| 2014/0147820 A1* | 5/2014 | Snow | G06F 19/3481 | 434/247 |
| 2014/0287389 A1* | 9/2014 | Kallmann | G06F 19/3481 | 434/247 |
| 2014/0317577 A1* | 10/2014 | Chen | G06F 3/011 | 715/863 |
| 2015/0036879 A1* | 2/2015 | Shiozaki | G06T 7/0046 | 382/103 |

FOREIGN PATENT DOCUMENTS

| | | |
|---|---|---|
| CN | 103118647 A | 5/2013 |
| EP | 2624553 A2 | 8/2013 |
| JP | H07108323 A | 4/1995 |
| JP | 2006190195 A | 7/2006 |
| JP | 2006302122 A | 11/2006 |
| JP | 2010258917 A | 11/2010 |
| JP | 2011062352 A | 3/2011 |
| JP | 2012517847 A | 8/2012 |
| JP | 2012178036 A | 9/2012 |
| JP | 2013157984 A | 8/2013 |
| WO | WO 2007006346 A1 | 1/2007 |
| WO | WO 2009035199 A1 | 3/2009 |

* cited by examiner

IMAGE DISPLAY METHOD AND APPARATUS

CROSS-REFERENCE TO RELATED APPLICATION

This application is a National Stage of International Patent Application No. PCT/CN2013/085893, filed on Oct. 24, 2013, which is hereby incorporated by reference in its entirety.

TECHNICAL FIELD

Embodiments of the present invention relate to the field of Internet communications, and in particular, to an image display method and apparatus.

BACKGROUND

As quality of life increases, users start to engage in some recreational activities in spare time, for example, learning yoga or dancing. However, for learning in a professional training institution, the users need to spare particular time to go to a particular place, and further need to pay training fees. Therefore, learning yoga or learning dancing at home by using a television device becomes a good choice for the users.

A user learns yoga or learns dancing at home by using a television device in the following way: The television device displays a yoga or dancing image, and the user performs, according to the yoga or dancing image displayed by the television device, movement imitation to learn yoga or dancing.

During the implementation of the present invention, the inventor finds that the prior art has at least the following problem:

When the user performs, according to the yoga or dancing image displayed by the television device, the movement imitation to learn yoga or dancing, the user watches a movement in the image on the television device while making a body movement, which distracts the user's attention, thereby causing a low learning speed and an undesirable learning effect on the user.

SUMMARY

To resolve the problem in the prior art, embodiments of the present invention provide an image display method and apparatus. The technical solutions are as follows:

According to a first aspect, an embodiment of the present invention provides an image display method, where the method includes:

acquiring a source image and a user image corresponding to the source image, where the user image is a movement image generated after a user imitates the source image;

processing the source image and the user image; and sending the processed source image and user image to a terminal, so that the terminal simultaneously displays the source image and the user image.

With reference to the first aspect, in a first possible implementation manner of the first aspect, the processing the source image and the user image includes:

acquiring description information of the source image and description information of the user image, and determining a difference between the user image and the source image according to the description information of the source image and the description information of the user image; or sending the source image and the user image to a server, so that the server generates description information of the source image and description information of the user image according to the source image and the user image, and the server determines a difference between the user image and the source image; and receiving the description information of the source image, the description information of the user image, and the difference between the user image and the source image that are sent by the server.

With reference to the first aspect, in a second possible implementation manner of the first aspect, the processing the source image and the user image includes:

setting an image size of the user image and an image size of the source image to a same size.

With reference to the first possible implementation manner of the first aspect, in a third possible implementation manner of the first aspect, the sending the processed source image and user image to a terminal, so that the terminal simultaneously displays the source image and the user image includes:

sending, to the terminal, the source image and the description information of the source image, the user image and the description information of the user image, and the difference between the user image and the source image, so that the terminal simultaneously displays the source image and the description information of the source image, and the user image and the description information of the user image, and the terminal marks the difference between the user image and the source image in the user image.

With reference to the first aspect, in a fourth possible implementation manner of the first aspect, the acquiring a source image and a user image corresponding to the source image includes:

acquiring the source image and a time stamp corresponding to the source image; and receiving a user image that is corresponding to the time stamp and sent by an image acquisition device.

According to a second aspect, an embodiment of the present invention provides an image display apparatus, where the apparatus includes:

an acquiring module, configured to acquire a source image and a user image corresponding to the source image, where the user image is a movement image generated after a user imitates the source image;

a processing module, configured to process the source image and the user image; and a sending module, configured to send the processed source image and user image to a terminal, so that the terminal simultaneously displays the source image and the user image.

With reference to the second aspect, in a first possible implementation manner of the second aspect, the processing module includes:

a first acquiring unit, configured to acquire description information of the source image and description information of the user image; and a determining unit, configured to determine a difference between the user image and the source image according to the description information of the source image and the description information of the user image; or a sending unit, configured to send the source image and the user image to a server, so that the server generates description information of the source image and description information of the user image according to the source image and the user image, and the server determines a difference between the user image and the source image; and a first receiving unit, configured to receive the description information of the source image, the description information of the user image, and the difference between the user image and the source image that are sent by the server.

With reference to the second aspect, in a second possible implementation manner of the second aspect, the processing module includes:

a setting unit, configured to set an image size of the user image and an image size of the source image to a same size.

With reference to the first possible implementation manner of the second aspect, in a third possible implementation manner of the second aspect, the sending module is configured to send, to the terminal, the source image and the description information of the source image, the user image and the description information of the user image, and the difference between the user image and the source image, so that the terminal simultaneously displays the source image and the description information of the source image, and the user image and the description information of the user image, and the terminal marks the difference between the user image and the source image in the user image.

With reference to the second aspect, in a fourth possible implementation manner of the second aspect, the acquiring module includes:

a second acquiring unit, configured to acquire the source image and a time stamp corresponding to the source image; and a second receiving unit, configured to receive a user image that is corresponding to the time stamp and sent by an image acquisition device.

According to a third aspect, an embodiment of the present invention provides an image display apparatus, where the apparatus includes a memory and a processor, and is configured to execute the image display method according to the first aspect.

With reference to the third aspect, in a first possible implementation manner of the third aspect, the apparatus is a set-top box device.

In embodiments of the present invention, a set-top box acquires a source image and a user image corresponding to the source image, processes the source image and the user image, and sends the processed source image and user image to a terminal; the terminal receives the source image and the user image that are sent by the set-top box, and simultaneously displays the source image and the user image. A terminal simultaneously presents a source image and a user image to a user, so that the user can visually compare a difference between the user image and the source image, which is convenient for the user to imitate the source image and accelerates a learning speed of the user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

The embodiments of the present invention are applicable to a television application in a living room, to help a user to perform movement training.

Embodiment 1

Figure 1:
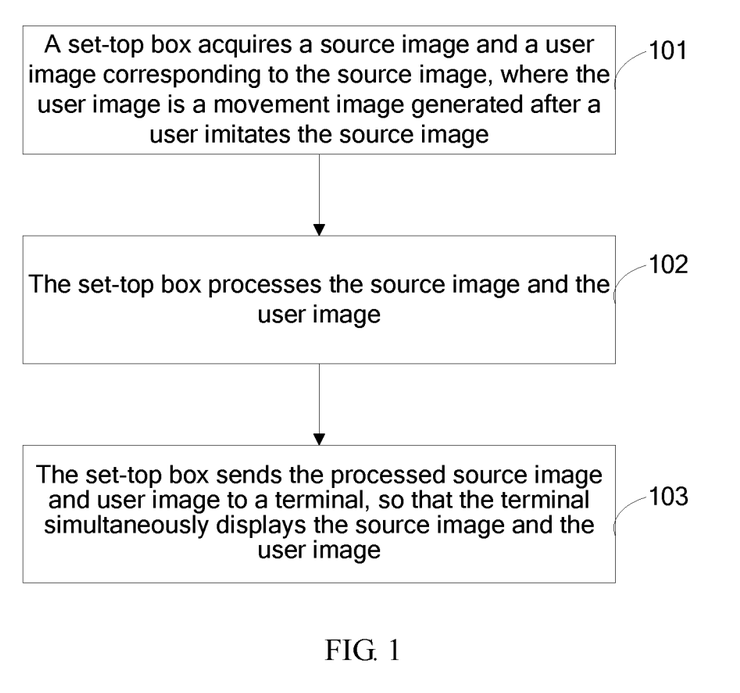
FIG. 1 is a flowchart of an image display method according to Embodiment 1 of the present invention.

This embodiment of the present invention provides an image display method. This embodiment is executed by any device that has a function of a set-top box, for example, a mobile phone and a tablet computer that have a function of a set-top box. In this embodiment of the present invention, description is provided by using an example in which a set-top box is used as an execution body. Referring to FIG. 1, the method includes:

101: The set-top box acquires a source image and a user image corresponding to the source image, where the user image is a movement image generated after a user imitates the source image.

102: The set-top box processes the source image and the user image.

103: The set-top box sends the processed source image and user image to a terminal, so that the terminal simultaneously displays the source image and the user image.

In this embodiment of the present invention, a set-top box acquires a source image and a user image corresponding to the source image, processes the source image and the user image, and sends the processed source image and user image to a terminal; the terminal receives the source image and the user image that are sent by the set-top box, and simultaneously displays the source image and the user image. A terminal simultaneously presents a source image and a user image to a user, so that the user can visually compare a difference between the user image and the source image, which is convenient for the user to imitate the source image and accelerates a learning speed of the user.

Embodiment 2

Figure 2:
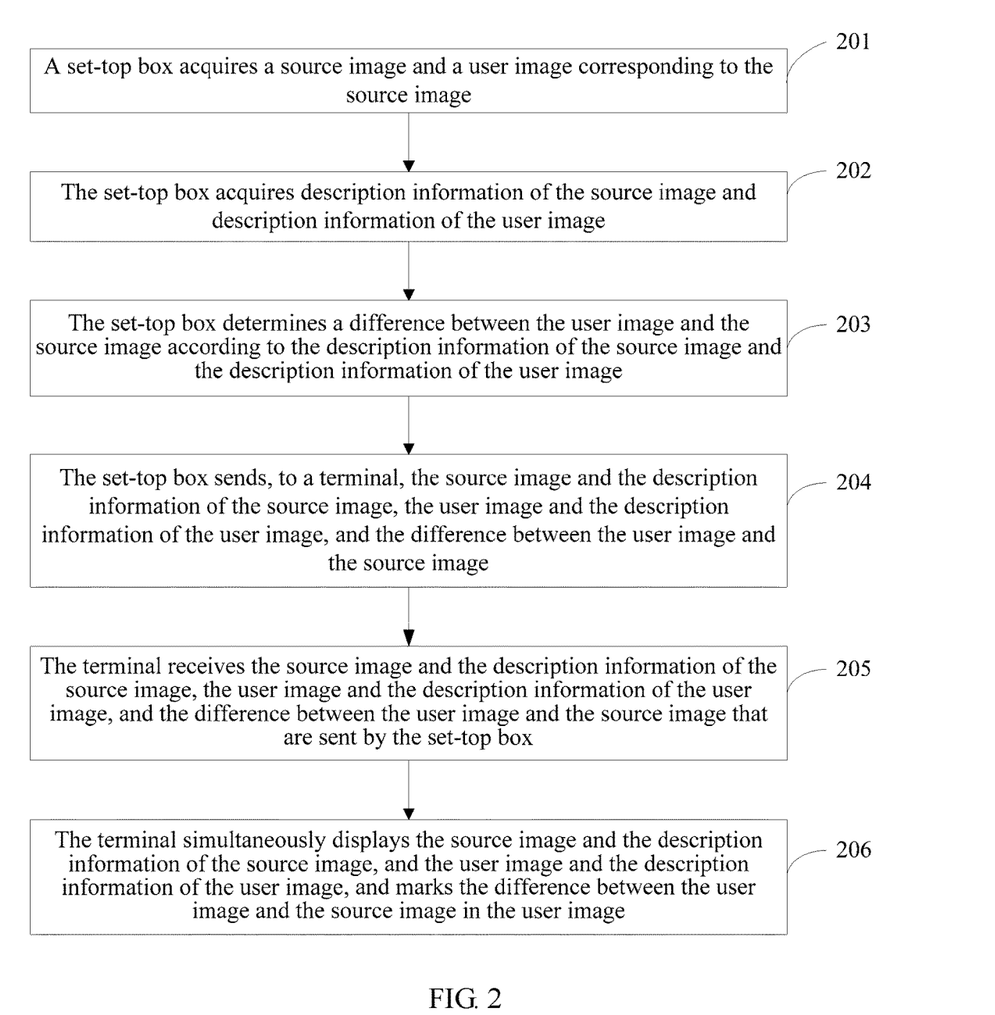
FIG. 2 is a flowchart of an image display method according to Embodiment 2 of the present invention.

This embodiment of the present invention provides an image display method. Referring to FIG. 2, the method includes:

201: A set-top box acquires a source image and a user image corresponding to the source image.

The source image refers to an original image accessed by a digital image editing and compression application program, and the source image may be a videotape, a laser disc, a digital image file, or the like. The user image is a movement image generated after a user imitates the source image.

The operation of acquiring, by the set-top box, a source image and a user image corresponding to the source image may be:

receiving, by the set-top box, an image stream sent by a digital video broadcast server or an IP (Internet Protocol) network server, and performing, according to a stored decryption password, decryption processing on the image stream to obtain a source image; and acquiring, by the set-top box, a time stamp corresponding to the source image, and receiving, according to the time stamp, a user image that is corresponding to the time stamp and sent by an image acquisition device.

It should be noted that, before or after the set-top box receives the image stream sent by the digital video broadcast server or the IP network server, the digital video broadcast server or the IP network server sends a decryption password of the image stream to the set-top box, and the set-top box receives the decryption password sent by the video broadcast server or the IP network server and stores the decryption password.

Further, after the set-top box acquires the source image, the set-top box sends the source image to a terminal. The terminal receives the source image sent by the set-top box and displays the source image. The user may imitate the source image according to the source image displayed by the terminal. The image acquisition device generates the user image by video-shooting or scanning.

In this embodiment of the present invention, the user image is the movement image generated after the user imitates the source image. After the terminal displays the source image, the user imitates, according to the source image displayed by the terminal, a movement in the image. The image acquisition device generates the user image by video-shooting or scanning. Therefore, the user image and the source image are not completely synchronous. A delay usually exists between the user image and the source image. The operation of receiving, by the set-top box according to the time stamp, a user image that is corresponding to the time stamp and sent by an image acquisition device may be:

acquiring, by the set-top box according to the time stamp corresponding to the source image, a user image that is generated after a preset time and corresponding to the time stamp.

The preset time is a time for the user to respond and to imitate the source image. The preset time may be set and changed according to a requirement of the user. In this embodiment of the present invention, no specific limitation is set on the preset time.

The image acquisition device is any device that has an image acquisition function. The image acquisition device may be a camera, a multichannel camera, or the like. In this embodiment of the present invention, only an example of the image acquisition device is provided, and no limitation is set on the image acquisition device.

Further, after acquiring the source image and the user image, the set-top box sets an image size of the user image and an image size of the source image to a same size.

The operation of setting, by the set-top box, an image size of the user image and an image size of the source image to a same size may be:

performing, by the set-top box according to the image size of the source image, zoom-in or zoom-out processing on the user image to set the image size of the user image and the image size of the source image to the same size.

It should be noted that when the image size of the user image is greater than the image size of the source image, the zoom-out processing is performed on the user image according to a ratio; when the image size of the user image is greater than the image size of the source image, the zoom-in processing is performed on the user image according to a specific ratio. In this way, the image size of the user image and the image size of the source image are the same size.

202: The set-top box acquires description information of the source image and description information of the user image.

The operation of acquiring, by the set-top box, description information of the source image and description information of the user image may be:

generating, by the set-top box, the description information of the source image according to the source image and a recognition algorithm, and generating the description information of the user image according to the user image and the recognition algorithm; or acquiring, by the set-top box, the description information of the source image from the received image stream, and generating the description information of the user image according to the user image and a recognition algorithm; or sending, by the set-top box to the server, the acquired source image and the acquired user image corresponding to the source image; receiving, by the server, the source image and the user image corresponding to the source image that are sent by the set-top box, generating the description information of the source image according to the source image and a recognition algorithm, and generating the description information of the user image according to the user image and the recognition algorithm; sending, by the server to the set-top box, the description information of the source image and the description information of the user image; and receiving, by the set-top box, the description information of the source image and the description information of the user image that are sent by the server.

The operation of acquiring, by the set-top box, the description information of the source image from the received image stream may be as follows:

the image stream sent by the digital video broadcast server or the IP network server includes the description information of the source image, and the set-top box receives the image stream sent by digital video broadcast or an IP network, and performs, according to the stored decryption password, decryption processing on the image stream to obtain the source image and the description information of the source image.

It should be noted that the recognition algorithm is any algorithm that can be used for recognizing a movement in an image, for example, establishing a human body image model to recognize a movement in an image. In this embodiment of the present invention, no specific limitation is set on the recognition algorithm.

A method for establishing a human body image model to recognize a movement in an image may be:
establishing a three-dimensional human body image model in advance to track a main body part of a human body, for example, establishing a model to track main body parts such as a head, an arm, a shoulder, and a foot; and tracking, with image time serving as a coordinate, important movement information, for example, changing amplitude, an angle, and a direction of a movement of the main body parts such as a head, an arm, a shoulder, and a foot.

When there are multiple individual images in the source image and when the human body image model is established, the set-top box may select any human body image as the human body image model. Preferably, the set-top box may select a human body image at the center of an image or occupying a main part of an image as the human body image model, or may prompt a focus to allow the user to select a human body image model.

For example, the set-top box tracks, according to the source image and by using the human body image model with image time serving as a coordinate, important movement information, for example, changing amplitude, an angle, and a direction of a movement of main body parts such as a head, an arm, a shoulder, and a foot in the source image. At a time stamp, description information, acquired by the set-top box, of the source image is: a left arm forms an angle of 45 degrees with a horizontal line and a right arm is downward vertically. At the same time stamp, description information, acquired by the set-top box, of the user image is: a left arm forms an angle of 30 degrees with a horizontal line and a right arm is downward vertically.

203: The set-top box determines a difference between the user image and the source image according to the description information of the source image and the description information of the user image.

Specifically, the set-top box acquires, according to the description information of the source image, a main body part of a human body and a movement corresponding to the main body part that are in the source image. The set-top box acquires, according to the description information of the user image, a main body part of a user and a movement corresponding to the main body part, and compares the movement corresponding to the main body part in the source image and the movement corresponding to the main body part in the user image to determine the difference between the user image and the source image.

For example, the description information of the source image is: a left arm forms an angle of 45 degrees with a horizontal line and a right arm is downward vertically. The description information of the user image is: a left arm forms an angle of 30 degrees with a horizontal line and a right arm is downward vertically. The set-top box acquires the following in the source image according to the description information of the source image: main body parts of a human body are the left arm and the right arm, a movement of the left arm is forming an angle of 45 degrees with a horizontal line, and a movement of the right arm is being downward vertically. The set-top box acquires the following in the user image according to the description information of the user image: main body parts of a human body are the left arm and the right arm, a movement of the left arm is forming an angle of 30 degrees with a horizontal line, and a movement of the right arm is being downward vertically. The set-top box compares the movements corresponding to the main body parts in the source image: the left arm forms the angle of 45 degrees with the horizontal line and the right arm is downward vertically, and the movements corresponding to the main body parts in the user image: the left arm forms the angle of 30 degrees with the horizontal line and the right arm is downward vertically. The set-top box determines that a difference between the user image and the source image is that angles formed between the left arms and the horizontal lines are different.

204: The set-top box sends, to a terminal, the source image and the description information of the source image, the user image and the description information of the user image, and the difference between the user image and the source image.

The terminal may be any terminal that has a display function. For example, the terminal may be a television device, a mobile phone terminal, a PC (personal computer) terminal, or the like. In this embodiment of the present invention, no specific limitation is set on the terminal.

205: The terminal receives the source image and the description information of the source image, the user image and the description information of the user image, and the difference between the user image and the source image that are sent by the set-top box.

The terminal receives the source image and the description information of the source image, the user image and the description information of the user image, and the difference between the user image and the source image that are sent by the set-top box, and then starts performing step 206.

206: The terminal simultaneously displays the source image and the description information of the source image, and the user image and the description information of the user image, and marks the difference between the user image and the source image in the user image.

Specifically, on a same display interface, the terminal simultaneously displays the source image and the user image, displays the description information of the source image and the description information of the user image, and marks the difference between the user image and the source image in the user image.

The terminal may also mark the difference between the user image and the source image in the source image, and display description information of the difference between the user image and the source image on the terminal.

For example, the following is displayed on the terminal: the source image and the description information of the source image: a left arm forms an angle of 45 degrees with a horizontal line and a right arm is downward vertically, and the user image and the description information of the user image: a left arm forms an angle of 30 degrees with a horizontal line and a right arm is downward vertically. The difference between the user image and the source image is marked in the user image displayed by the terminal. The description information about the difference between the user image and the source image is displayed: angles formed between the left arms and the horizontal lines are different.

In this embodiment of the present invention, a set-top box acquires a source image and a user image corresponding to the source image, processes the source image and the user image, and sends the processed source image and user image to a terminal; the terminal receives the source image and the user image that are sent by the set-top box, and simultaneously displays the source image and the user image. A terminal simultaneously presents a source image and a user image to a user, so that the user can visually compare a difference between the user image and the source image, which is convenient for the user to imitate the source image and accelerates a learning speed of the user.

Embodiment 3

Figure 3:
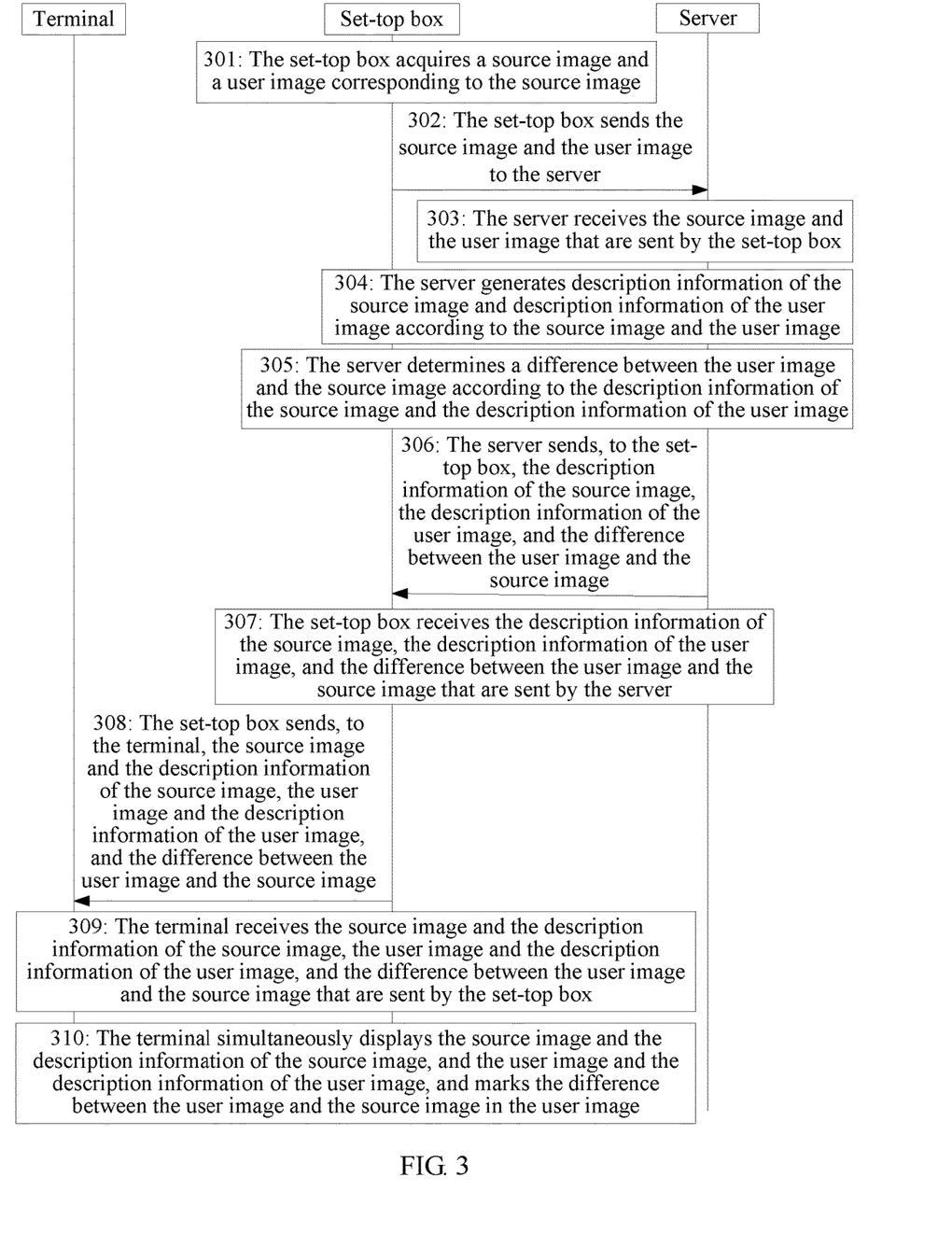
FIG. 3 is a flowchart of an image display method according to Embodiment 3 of the present invention.

This embodiment of the present invention provides an image display method. Referring to FIG. 3, the method includes:

301: A set-top box acquires a source image and a user image corresponding to the source image.

The source image refers to an original image accessed by a digital image editing and compression application program, and the source image may be a videotape, a laser disc, a digital image file, or the like. The user image is a movement image generated after a user imitates the source image.

The operation of acquiring, by the set-top box, a source image and a user image corresponding to the source image may be:

receiving, by the set-top box, an image stream sent by a digital video broadcast server or an IP (Internet Protocol) network server, and performing, according to a stored decryption password, decryption processing on the image stream to obtain a source image; and acquiring, by the set-top box, a time stamp corresponding to the source image, and receiving, according to the time stamp, a user image that is corresponding to the time stamp and sent by an image acquisition device.

It should be noted that, before or after the set-top box receives the image stream sent by the digital video broadcast server or the IP network server, the digital video broadcast server or the IP network server sends a decryption password of the image stream to the set-top box, and the set-top box receives the decryption password sent by the video broadcast server or the IP network server and stores the decryption password.

Further, after the set-top box acquires the source image, the set-top box sends the source image to a terminal. The terminal receives the source image sent by the set-top box and displays the source image. The user may imitate the source image according to the source image displayed by the terminal. The image acquisition device generates the user image by video-shooting or scanning.

In this embodiment of the present invention, the user image is the movement image generated after the user imitates the source image. After the terminal displays the source image, the user imitates, according to the source image displayed by the terminal, a movement in the image. The image acquisition device generates the user image by video-shooting or scanning. Therefore, the user image and the source image are not completely synchronous. A specific delay usually exists between the user image and the source image. The operation of receiving, by the set-top box according to the time stamp, a user image that is corresponding to the time stamp and sent by an image acquisition device may be:

acquiring, by the set-top box according to the time stamp corresponding to the source image, a user image that is generated after a preset time and corresponding to the time stamp.

The preset time is time for the user to respond and to imitate the source image. The preset time may be set and changed according to a requirement of the user. In this embodiment of the present invention, no specific limitation is set on the preset time.

The image acquisition device is any device that has an image acquisition function. The image acquisition device may be a camera, a multichannel camera, or the like. In this embodiment of the present invention, only an example of the image acquisition device is provided, and no limitation is set on the image acquisition device.

Further, after acquiring the source image and the user image, the set-top box sets an image size of the user image and an image size of the source image to a same size.

The operation of setting, by the set-top box, an image size of the user image and an image size of the source image to a same size may be:

performing, by the set-top box according to the image size of the source image, zoom-in or zoom-out processing on the user image to set the image size of the user image and the image size of the source image to the same size.

It should be noted that when the image size of the user image is greater than the image size of the source image, the zoom-out processing is performed on the user image according to a specific ratio; when the image size of the user image is greater than the image size of the source image, the zoom-in processing is performed on the user image according to a specific ratio. In this way, the image size of the user image and the image size of the source image are the same size.

302: The set-top box sends the source image and the user image to a server.

The server is any server that has an image processing function. In this embodiment of the present invention, no specific limitation is set on the server.

The set-top box sends the source image and the user image to the server, so that the server performs processing on the source image and the user image, and therefore, burden of the set-top box can be relieved, and a situation in which breakdown occurs on the set-top box can be avoided.

303: The server receives the source image and the user image that are sent by the set-top box.

304: The server generates description information of the source image and description information of the user image according to the source image and the user image.

Specifically, the server generates the description information of the source image according to the source image and a recognition algorithm, and generates the description information of the user image according to the user image and the recognition algorithm.

It should be noted that the recognition algorithm is any algorithm that can be used for recognizing a movement in an image, for example, establishing a human body image model to recognize a movement in an image. In this embodiment of the present invention, no specific limitation is set on the recognition algorithm.

A method for establishing a human body image model to recognize a movement in an image may be:

establishing a three-dimensional human body image model in advance to track a main body part of a human body, for example, establishing a model to track main body parts such as a head, an arm, a shoulder, and a foot; and tracking, with image time serving as a coordinate, important movement information, for example, changing amplitude, an angle, and a direction of a movement of the main body parts such as a head, an arm, a shoulder, and a foot.

When there are multiple individual images in the source image and when the human body image model is established, the server may select any human body image as the human body image model. Preferably, the server may select a human body image at the center of an image or occupying a main part of an image as the human body image model, or may prompt a focus to allow the user to select a human body image model.

305: The server determines a difference between the user image and the source image according to the description information of the source image and the description information of the user image.

Specifically, the server acquires, according to the description information of the source image, a main body part of a human body and a movement corresponding to the main body part that are in the source image. The server acquires, according to the description information of the user image, a main body part of a user and a movement corresponding to the main body part, and compares the movement corresponding to the main body part in the source image and the movement corresponding to the main body part in the user image to determine the difference between the user image and the source image.

306: The server sends, to the set-top box, the description information of the source image, the description information of the user image, and the difference between the user image and the source image.

307: The set-top box receives the description information of the source image, the description information of the user image, and the difference between the user image and the source image that are sent by the server.

308: The set-top box sends, to a terminal, the source image and the description information of the source image, the user image and the description information of the user image, and the difference between the user image and the source image.

The terminal may be any terminal that has a display function. For example, the terminal may be a television device, a mobile phone terminal, a PC (personal computer) terminal, or the like. In this embodiment of the present invention, no specific limitation is set on the terminal.

309: The terminal receives the source image and the description information of the source image, the user image and the description information of the user image, and the difference between the user image and the source image that are sent by the set-top box.

The terminal receives the source image and the description information of the source image, the user image and the description information of the user image, and the difference between the user image and the source image that are sent by the set-top box, and then starts performing step 310.

310: The terminal simultaneously displays the source image and the description information of the source image, and the user image and the description information of the user image, and marks the difference between the user image and the source image in the user image.

Specifically, on a same display interface, the terminal simultaneously displays the source image and the user image, displays the description information of the source image and the description information of the user image, and marks the difference between the user image and the source image in the user image.

The terminal may also mark the difference between the user image and the source image in the source image, and display description information of the difference between the user image and the source image on the terminal.

In this embodiment of the present invention, a set-top box acquires a source image and a user image corresponding to the source image, processes the source image and the user image, and sends the processed source image and user image to a terminal; the terminal receives the source image and the user image that are sent by the set-top box, and simultaneously displays the source image and the user image. A terminal simultaneously presents a source image and a user image to a user, so that the user can visually compare a difference between the user image and the source image, which is convenient for the user to imitate the source image and accelerates a learning speed of the user. In addition, the set-top box sends the source image and the user image to a server; the server generates description information of the source image and description information of the user image, and the server determines a difference between the user image and the source image, and therefore, burden of the set-top box is relieved.

Embodiment 4

Figure 4:
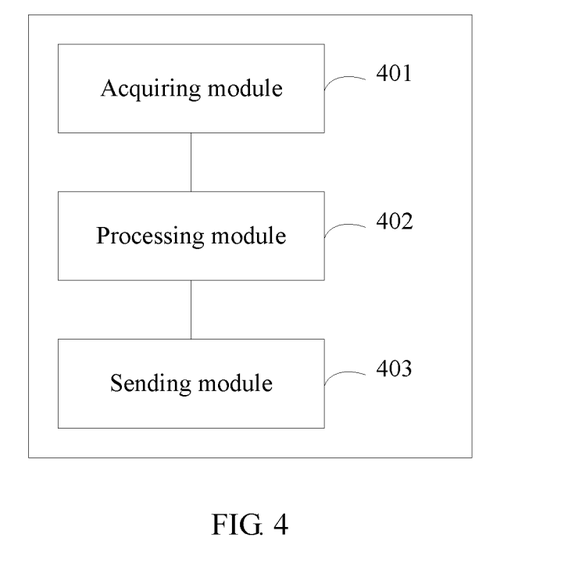
FIG. 4 is a schematic diagram of a structure of an image display apparatus according to Embodiment 4 of the present invention.

This embodiment of the present invention provides an image display apparatus. Referring to FIG. 4, the apparatus includes:

an acquiring module 401, configured to acquire a source image and a user image corresponding to the source image, where the user image is a movement image generated after a user imitates the source image;

a processing module 402, configured to process the source image and the user image; and a sending module 403, configured to send the processed source image and user image to a terminal, so that the terminal simultaneously displays the source image and the user image.

Figure 5:
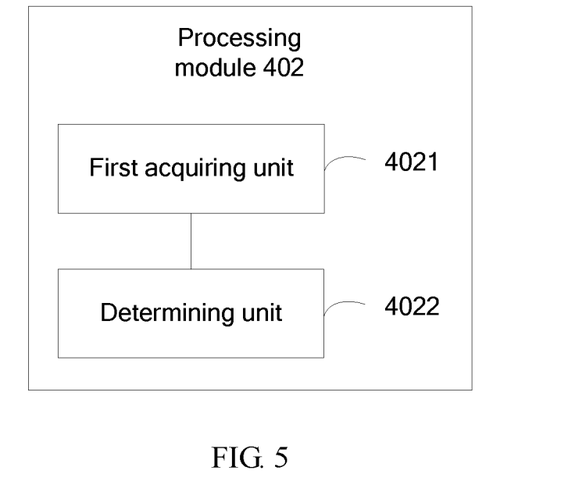
FIG. 5 is a schematic diagram of a structure of a processing module of the apparatus according to Embodiment 4 of the present invention.

Further, referring to FIG. 5, the processing module 402 includes:

a first acquiring unit 4021, configured to acquire description information of the source image and description information of the user image; and a determining unit 4022, configured to determine a difference between the user image and the source image according to the description information of the source image and the description information of the user image.

Figure 6:
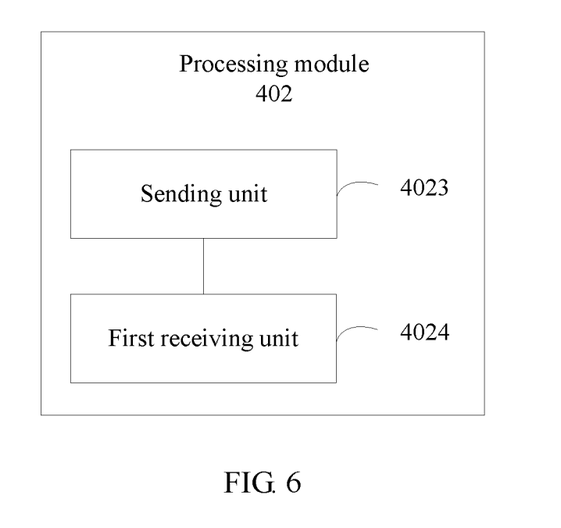
FIG. 6 is another schematic diagram of a structure of the processing module of the apparatus according to Embodiment 4 of the present invention.

Alternatively, referring to FIG. 6, the processing module 402 includes:

a sending unit 4023, configured to send the source image and the user image to a server, so that the server generates description information of the source image and description information of the user image according to the source image and the user image, and the server determines a difference between the user image and the source image; and a first receiving unit 4024, configured to receive the description information of the source image, the description information of the user image, and the difference between the user image and the source image that are sent by the server.

Figure 7:
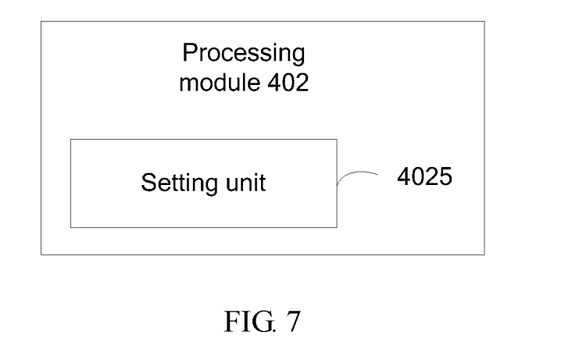
FIG. 7 is another schematic diagram of a structure of the processing module of the apparatus according to Embodiment 4 of the present invention.

Further, referring to FIG. 7, the processing module 402 includes:

a setting unit 4025, configured to set an image size of the user image and an image size of the source image to a same size.

Further, the sending module 403 is configured to send, to the terminal, the source image and the description information of the source image, the user image and the description information of the user image, and the difference between the user image and the source image, so that the terminal simultaneously displays the source image and the description information of the source image, and the user image and the description information of the user image, and the terminal marks the difference between the user image and the source image in the user image.

Figure 8:
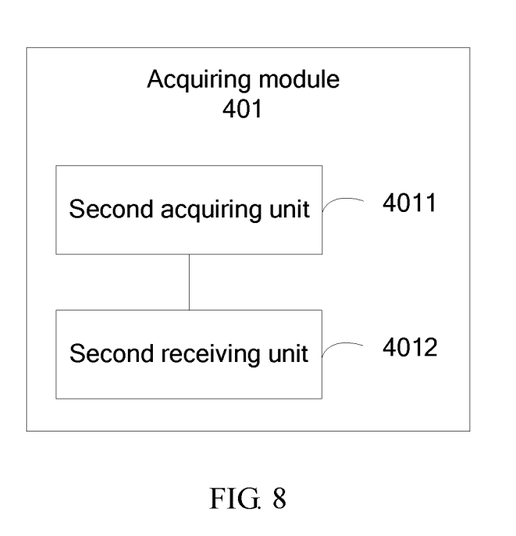
FIG. 8 is a schematic diagram of a structure of an acquiring module of the apparatus according to Embodiment 4 of the present invention.

Further, referring to FIG. 8, the acquiring module 401 includes:
  a second acquiring unit 4011, configured to acquire the source image and a time stamp corresponding to the source image; and
  a second receiving unit 4012, configured to receive a user image that is corresponding to the time stamp and sent by an image acquisition device.

In this embodiment of the present invention, a set-top box acquires a source image and a user image corresponding to the source image, processes the source image and the user image, and sends the processed source image and user image to a terminal; the terminal receives the source image and the user image that are sent by the set-top box, and simultaneously displays the source image and the user image. A terminal simultaneously presents a source image and a user image to a user, so that the user can visually compare a difference between the user image and the source image, which is convenient for the user to imitate the source image and accelerates a learning speed of the user. In addition, the set-top box sends the source image and the user image to a server; the server generates description information of the source image and description information of the user image, and the server determines a difference between the user image and the source image, and therefore, burden of the set-top box is relieved.

Embodiment 5

Figure 9:
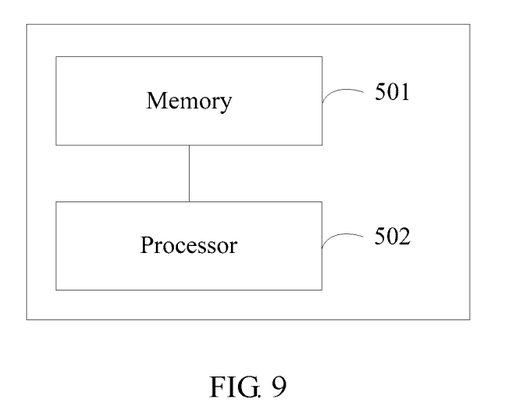
FIG. 9 is a schematic diagram of a structure of another image display apparatus according to Embodiment 5 of the present invention.

This embodiment of the present invention provides an image display apparatus. Referring to FIG. 9, the apparatus includes a memory 501 and a processor 502, and is configured to execute the following image display method:
  acquiring a source image and a user image corresponding to the source image, where the user image is a movement image generated after a user imitates the source image;
  processing the source image and the user image; and
  sending the processed source image and user image to a terminal, so that the terminal simultaneously displays the source image and the user image.

Further, the processing the source image and the user image includes:
  acquiring description information of the source image and description information of the user image, and determining a difference between the user image and the source image according to the description information of the source image and the description information of the user image; or
  sending the source image and the user image to a server, so that the server generates description information of the source image and description information of the user image according to the source image and the user image, and the server determines a difference between the user image and the source image; and receiving the description information of the source image, the description information of the user image, and the difference between the user image and the source image that are sent by the server.

Further, the processing the source image and the user image includes:
  setting an image size of the user image and an image size of the source image to a same size.

Further, the sending the processed source image and user image to a terminal, so that the terminal simultaneously displays the source image and the user image includes:
  sending, to the terminal, the source image and the description information of the source image, the user image and the description information of the user image, and the difference between the user image and the source image, so that the terminal simultaneously displays the source image and the description information of the source image, and the user image and the description information of the user image, and the terminal marks the difference between the user image and the source image in the user image.

Further, the acquiring a source image and a user image corresponding to the source image includes:
  acquiring the source image and a time stamp corresponding to the source image; and
  receiving a user image that is corresponding to the time stamp and sent by an image acquisition device.

Further, the apparatus is a set-top box device.

In this embodiment of the present invention, a set-top box acquires a source image and a user image corresponding to the source image, processes the source image and the user image, and sends the processed source image and user image to a terminal; the terminal receives the source image and the user image that are sent by the set-top box, and simultaneously displays the source image and the user image. A terminal simultaneously presents a source image and a user image to a user, so that the user can visually compare a difference between the user image and the source image, which is convenient for the user to imitate the source image and accelerates a learning speed of the user. In addition, the set-top box sends the source image and the user image to a server; the server generates description information of the source image and description information of the user image, and the server determines a difference between the user image and the source image, and therefore, burden of the set-top box is relieved.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. An image display method performed by a set-top box, wherein the method comprises:
  acquiring a source image;
  acquiring a user image corresponding to the source image, wherein the user image is taken from a plurality of images of a user image stream generated while a user imitates a displayed movement according to a source image stream;
  processing the source image and the user image to render a processed source image information and a processed user image information wherein the processing comprises:
    acquiring a source image textual description of the source image and a user image textual description of the user image, and determining a difference between the user image and the source image according to the source image textual description and the user image textual description; and sending the difference between the user image and the source image, the processed source image information and, the processed user image information to a terminal for simultaneously displaying, at the terminal, the difference along with the processed source image information and the processed user image information, wherein the source image textual description and the user image textual description specify a position of a body part, and wherein the difference between the user image and the source image describes a difference between a body part position textual description in the source image textual description and a corresponding body part position textual description in the user image textual description, wherein the difference comprises a difference textual description, wherein the sending further comprises sending, to the terminal, the source image textual description, the user image textual description, and the difference textual description for simultaneously displaying, with the processed source image information and the processed user image information at the terminal, the source image textual description, the user image textual description, and an indication, based on the difference textual description, of the difference between the user image and the source image, and wherein the acquiring a source image and a user image corresponding to the source image comprises:
  acquiring the source image and a time stamp corresponding to the source image; and
  receiving a user image that is corresponding to the time stamp and sent by an image acquisition device.

2. The method according to claim 1, wherein the processing the source image and the user image comprises:
  setting an image size of the processed user image information and an image size of the processed source image information to a same image size.

3. The method according to claim 1, wherein the indication of the difference comprises a marking of the difference between the user image and the source image.

4. The method according to claim 1, wherein the indication of the difference comprises a display of the difference textual description.

5. An image display apparatus, wherein the apparatus comprises a processor and a non-transitory computer-readable storage medium including computer-executable instructions executed by the processor to perform operations comprising:
  acquiring a source image and a user image corresponding to the source image, wherein the user image is taken from a plurality of images of a user image stream generated while a user imitates a displayed movement according to a source image stream;
  processing the source image and the user image to render a processed source image information and a processed user image information wherein the processing comprises:
    acquiring a source image textual description of the source image and a user image textual description of the user image, and
    determining a difference between the user image and the source image according to the source image textual description and the user image textual description; and
  sending the difference between the user image and the source image, the processed source image information and the processed user image information to a terminal for simultaneously displaying, at the terminal, the difference along with the processed source image information and the processed user image information,
  wherein the source image textual description and the user image textual description specify a position of a body part, and
  wherein the difference between the user image and the source image describes a difference between a body part position textual description in the source image textual description and a corresponding body part position textual description in the user image textual description,
  wherein the difference comprises a difference textual description,
  wherein the sending further comprises sending, to the terminal, the source image textual description, the user image textual description, and the difference textual description for simultaneously displaying, with the processed source image information and the processed user image information at the terminal, the source image textual description, the user image textual description, and an indication, based on the difference textual description, of the difference between the user image and the source image, and
  wherein the acquiring a source image and a user image corresponding to the source image comprises:
    acquiring the source image and a time stamp corresponding to the source image; and
    receiving a user image that is corresponding to the time stamp and sent by an image acquisition device.

6. The apparatus according to claim 5, wherein the processing the source image and the user image comprises:
  setting an image size of the user image and an image size of the source image to a same size.

7. The apparatus according to claim 6, wherein the apparatus is a set-top box device.

8. The apparatus according to claim 5, wherein the apparatus is a set-top box device.

9. The apparatus according to claim 5, wherein the indication of the difference comprises a marking of the difference between the user image and the source image.

10. The apparatus according to claim 5, wherein the indication of the difference comprises a display of the difference textual description.

* * * * *